(No Model.)

W. WOOD.
ASBESTUS PACKING RING.

No. 326,079. Patented Sept. 8, 1885.

Witnesses:
George E. Gibson
Harry Drury

Inventor:
W. Wood
by his attys.
Howson & Son

UNITED STATES PATENT OFFICE.

WILLIAM WOOD, OF PHILADELPHIA, PENNSYLVANIA, ASSIGNOR OF ONE-HALF TO JOSIAH SIBLEY, OF SAME PLACE.

ASBESTUS PACKING-RING.

SPECIFICATION forming part of Letters Patent No. 326,079, dated September 8, 1885.

Application filed July 2, 1885. (No model.)

*To all whom it may concern:*

Be it known that I, WILLIAM WOOD, a citizen of the United States, and a resident of Philadelphia, Pennsylvania, have invented certain Improvements in Asbestus Packing Rings or Gaskets, of which the following is a specification.

The object of my invention is to so construct an asbestus packing ring or gasket as to prevent waste of material and insure an effective packing of the joint; and this object I attain in the manner which I will now proceed to describe, reference being had to the accompanying drawings, in which—

Figure 1:
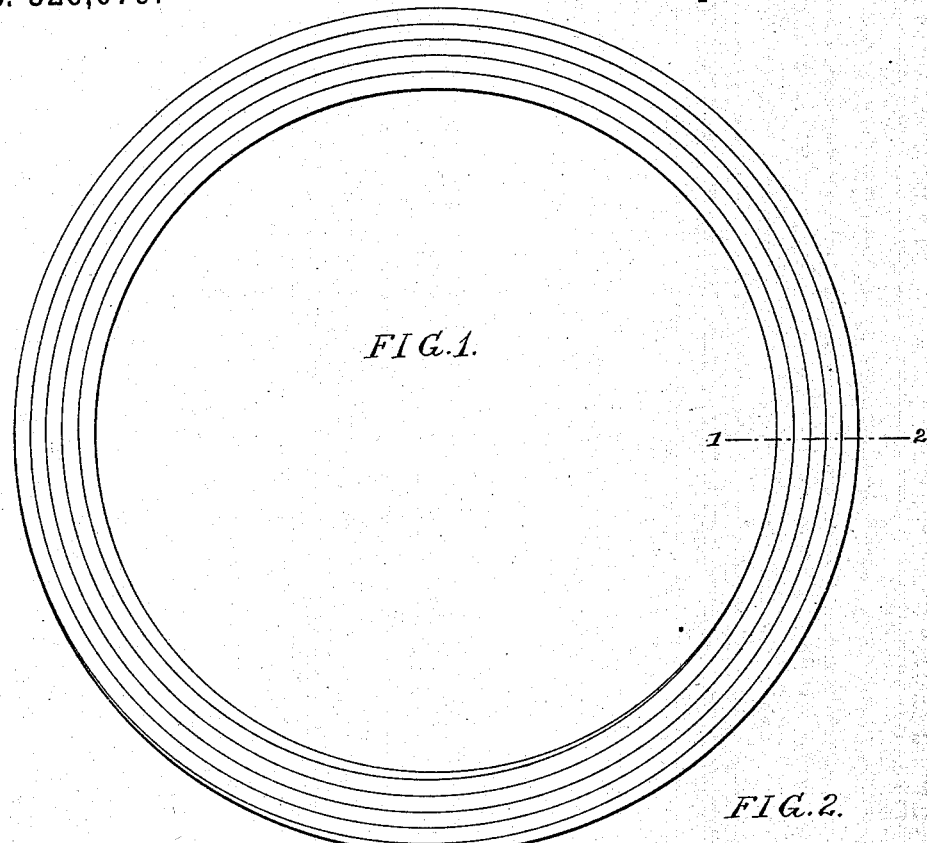
Figure 2:

Figure 1 is a face view of a packing ring or gasket constructed in accordance with my invention; Fig. 2, a transverse section, on an enlarged scale, on the line 1 2; and Fig. 3, a view of another form of my improved gasket.

Ordinary asbestus packing rings or gaskets cut from sheets of asbestus-board are objectionable on account of the waste due to the method of production, and also on account of the comparatively solid and inelastic character of the gaskets so made.

In carrying out my invention, therefore, I make the ring or gasket by coiling a cord, rope, or strand of asbestus made by spinning and twisting the fiber in any of the usual ways, the coils forming a flat web of the desired shape and dimensions, and being secured together so as to preserve this shape.

Figure 3:
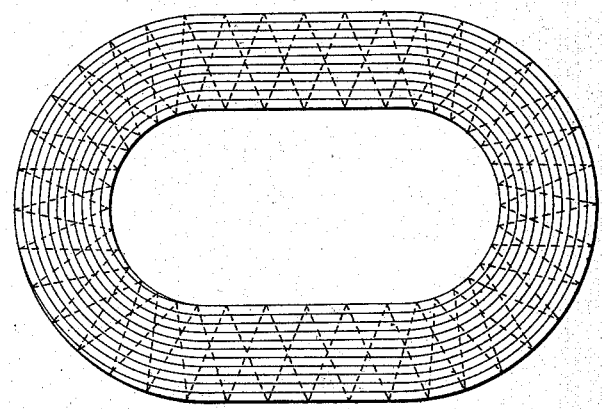

The securing of the coils together may be effected by paste or any suitable cement; but where the gasket is one which is likely to be subjected to considerable handling it is preferable to secure the coils together by cross-stitching, as shown in Fig. 3.

A gasket can be made in this manner without any loss of material, and will provide a better packing than a gasket cut from asbestus-board as usual, owing to the fact that it presents opposite bearing-faces composed of a series of rounded projections with interstices, so that when subjected to pressure a certain lateral yield of each coil is permitted, the gasket possessing an elasticity which conduces to the formation of a perfect joint.

I claim as my invention—

1. A packing ring or gasket composed of strands or cords of asbestus fiber coiled and secured together side by side so as to form the gasket, as set forth.

2. A packing ring or gasket composed of strands or cords of asbestus fiber coiled into the shape of the ring or gasket, and having the coils secured together by cross-stitching, as specified.

In testimony whereof I have signed my name to this specification in the presence of two subscribing witnesses.

WILLIAM WOOD.

Witnesses:
WILLIAM F. DAVIS,
HARRY SMITH.